United States Patent

Elliott

[15] 3,675,103
[45] July 4, 1972

[54] SEGMENT WIPE CONTROL FOR WINDSHIELD WIPER SYSTEM

[72] Inventor: James O. Elliott, Xenia, Ohio
[73] Assignee: General Motors Corporation, Detroit, Mich.
[22] Filed: Oct. 6, 1970
[21] Appl. No.: 78,439

[52] U.S. Cl. ..................318/281, 15/250.13, 318/DIG. 2
[51] Int. Cl. ..............................................B60s 1/02
[58] Field of Search ..................318/281–286, 443, 318/266, 466; 15/250.13, 250.12

[56] References Cited

UNITED STATES PATENTS

| | | | |
|---|---|---|---|
| 3,145,407 | 8/1964 | Page et al. | 318/282 X |
| 1,608,985 | 11/1926 | McCaleb | 318/282 X |
| 2,416,229 | 2/1947 | Shoemaker | 318/281 |
| 1,644,545 | 10/1927 | Robertson | 318/282 |
| 2,875,464 | 3/1959 | Collins | 15/250.13 |
| 2,834,979 | 5/1958 | Roth | 15/250.13 |

Primary Examiner—J. D. Miller
Assistant Examiner—Robert J. Hickey
Attorney—E. W. Christen and C. R. Meland

[57] ABSTRACT

The segment wipe control of this invention affords operation of an automotive windshield wiper system to wipe an area substantially less than the area of the normal wipe. To effect the segment wipe, the current supplied the armature of the windshield wiper system's DC drive motor is periodically reversed to cause the motor to reverse the direction of its rotation. To accomplish this reversal of current, a double-pole, double-throw relay energized through two cam actuated switches is utilized to switch the motor feed connections and concurrently reverse the polarity of the current supplied to the motor. The cam actuated switches are alternately actuated by a cam driven by the motor's output shaft, thus synchronizing the reversals of the DC motor with the sweep of the windshield wiper blades which are driven by linkage connected with the motor's output shaft.

3 Claims, 2 Drawing Figures

INVENTOR.
James O. Elliott
BY
C. R. Meland
ATTORNEY

SEGMENT WIPE CONTROL FOR WINDSHIELD WIPER SYSTEM

This invention relates to a segment wipe control for an automotive windshield wiper system.

In the past, various control arrangements have been used to provide variable sweep windshield wiper mechanisms for motor vehicles. Some of these prior art systems provide wipe areas dependent on operator selection. In general, to accomplish the variable sweep, these known windshield wiper systems have relied on some means for varying the throw of the drive linkage connecting the wipers and the wiper power source. In contrast to this technique, the present invention provides a full area wipe and a segment wipe mode in which both operating modes use the same mechanical linkage arrangement. The segment wipe is effected through periodic reversals of the windshield wiper system's drive motor.

Accordingly, it is an object of the present invention to provide an electric motor driven automotive windshield wiper system including a segment wipe mode wherein the windshield wiper system wipes an area substantially less than the area of the normal wipe at an increased wipe frequency and wherein this object is carried forward without varying the mechanical linkage interconnecting the electric motor and wiper blades.

Another object of the present invention is to provide a windshield wiper system of the type described wherein the segment wipe mode is provided by reversing the direction of current supplied the wiper system's DC drive motor to reverse the motor's direction of rotation.

These and further objects and advantages of the present invention will be apparent in light of the description included herein. The following figures incorporated in the description illustrate the preferred embodiment of the present invention.

IN THE DRAWINGS

Figure 1:
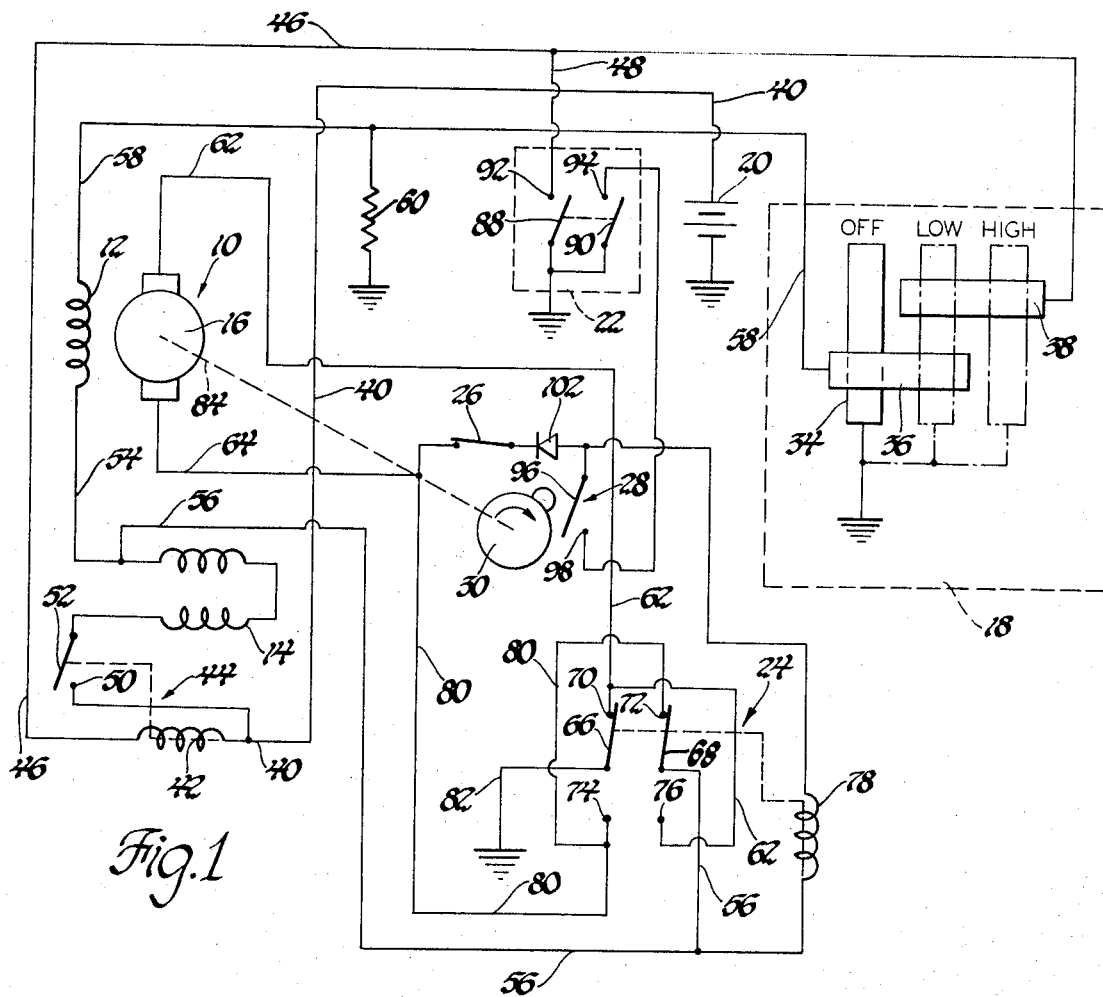
FIG. 1 is a control circuit schematic of a windshield wiper system including provision for a segment wipe mode made in accordance with this invention.
Figure 2:
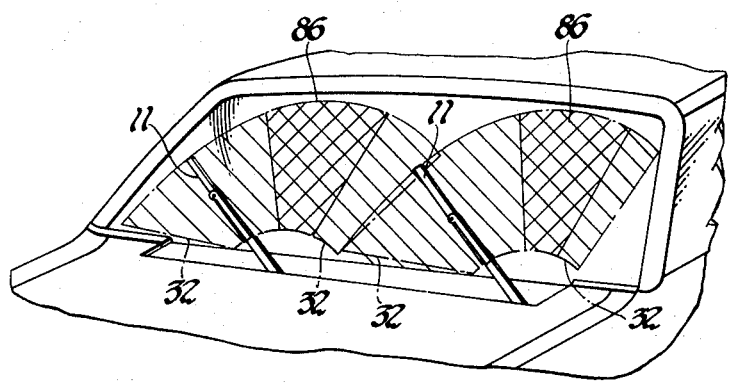
FIG. 2 shows graphically the two modes of operation, normal and segment wipe, of the windshield wiper system of this invention.

Referring now to the drawings and more particularly to FIG. 1, a control circuit schematic for an automotive windshield wiper system is shown in which a DC drive motor 10 is utilized to drive a pair of windshield wiper blades 11 shown in FIG. 2. This DC drive motor 10 includes a shunt field 12, a series field 14, and a wound armature 16 whose winding is not illustrated in the drawing. The motor's armature 16 is connected through its output shaft with a conventional drive linkage (not illustrated) to drive the windshield wiper blades 11 back and forth over the surface of the automobile's windshield in the pattern illustrated graphically in FIG. 2. During normal wiping operation, the motor is driven continuously in one direction and the drive linkage reverses the movement of the wiper blades 11 at the end of each stroke. In the segment wipe mode of operation, the drive motor 10 reverses the direction of its rotation to reverse the direction of travel of the wiper blades 11 to wipe the windshield.

A control switch 18 interconnects the windings of the DC motor 10 with a source of direct voltage represented as a battery 20. This control switch 18 provides control for motor operation in a manner more fully set forth hereinafter. A segment wipe switch 22 together with a double-pole, double-throw relay 24, two cam actuated switches 26 and 28, and a cam 30 driven by the output shaft of motor 10 provides control for the segment wipe mode of operation. The character and control of the segment wipe mode of operation are more completely described below. The control sequence and the normal operation of the windshield wiper system will now be described. At the completion of this description, the segment wipe mode of operation will be described. In FIG. 2, the entire crosshatched area including all of the single crosshatched area 32 represents the normal wiping pattern of the windshield wiper system.

In FIG. 1, control switch 18 provides three operating positions, OFF, LOW, and HIGH, to control the windshield wiper system's normal operation. The movable contact bar 34 of switch 18 can assume any of the three positions shown in FIG. 1. This contact bar slides from one position to another connecting the OFF, LOW or HIGH contacts with ground. When the contact 34 is in the OFF position as shown in FIG. 1, it connects contact member 36 with ground. When the contact 34 is moved to the LOW position, it connects both contacts 36 and 38 with ground. And in a similar manner, it is seen from FIG. 1 that in the HIGH position, contact 34 connects contact 38 with ground.

The battery 20 is connected in the control arrangement with its negative terminal conductively connected with contact 34 through ground and its positive terminal connected by means of a conductor 40 with one side of coil 42 of relay 44. The other side of coil 42 is connected by conductor 46 with contact 38 of the control switch 18. Conductor 46 also connects coil 42 with the segment wipe switch 22 through conductor 48. Inasmuch as this connection with the segment wipe switch does not affect normal operation, further discussion of this connection will be postponed until the segment wipe mode of operation is described.

The relay 44 includes a fixed contact 50 and a movable contact 52 with the movable contact 52 normally separated from the fixed contact 50 by a biasing means such as a spring. When the relay coil 42 is energized, the movable contact 52 is pulled into engagement with the fixed contact 50. One end of the series field 14 of motor 10 is connected with the movable contact 52. A conductor 54 connects the other end of the series field 14 with the shunt field 12. A conductor 56 provides a connection between the double-pole, double-throw relay 24 and the conductor 54. A conductor 58 connects the shunt field 12 with contact 36 of the control switch 18. A resistor 60 is connected between the conductor 58 and ground. This completes the electrical connections of the fields 12 and 14 necessary for normal operation.

Considering the feed circuit for the armature 16 of the motor 10, it is noted that two conductors 62 and 64 provide a path for energization current to the armature's winding. During normal operation of the windshield wiper system, this path includes the two movable contacts 66 and 68 of the relay 24 and the two fixed contacts 70 and 72 of this relay. Movable contacts 66 and 68 move concurrently into engagement with the two additional fixed contacts 74 and 76 of the relay when the relay coil 78 is energized. During normal operation, the coil 78 of relay 24 is deenergized and the movable contacts 66 and 68 remain in engagement with fixed contacts 70 and 72. The operative effect of energizing the coil 78 is described in conjunction with the explanation of the segment wipe mode of operation below.

For low speed operation, contact 34 is moved to the LOW position of the control switch 18 providing a connection to ground for both the fixed contacts 36 and 38. When contact 38 is connected with ground, relay coil 42 is energized through a path which is traced from the positive terminal of battery 20 through conductor 40, through the coil 42, through conductor 46, through contacts 38 and 34 to ground, and through ground to the negative terminal of the battery 20. Accordingly, coil 42 is energized and movable contact 52 engages fixed contact 50 to energize series field 14 and shunt field 12. The energization path includes conductor 40 which is connected with the positive terminal of the battery 20, the completed contact 50-contact 52 connection, series field 14, shunt field 12, conductor 58, contacts 34 and 36, and the ground connection with the negative terminal of battery 20. Resistor 60 is effectively shunted by the circuit through conductor 58 and contacts 34 and 36 to ground. In this manner, the field windings 12 and 14 are energized for low speed operation.

The energization of the winding of armature 16 during low speed operation is completed through a circuit traced from the positive terminal of battery 20 through conductor 40, through contacts 50 and 52, through the series field 14, through conductor 56, through contacts 68 and 72 of relay 24, through conductor 80, through conductor 64, through the armature winding of armature 16, through conductor 62, through contacts 66 and 70, through conductor 82, and through ground to the negative terminal of battery 20. In this manner, both fields of the DC motor 10 and the armature are energized to drive the windshield wipers at low speed.

When contact 34 is moved to the HIGH position of control switch 18, the DC motor 10 operates at high speed. The energization of coil 42 is through the same circuit path detailed above for low speed operation. The circuit path for exciting the armature winding is likewise identical with that described above for low speed operation. The only difference between the high speed and the low speed connections is that when control switch 18 is in the HIGH position, resistor 60 provides the return path for current from conductor 58 through ground to the negative terminal of the battery 20. This connection replaces the contact 34, contact 36 connection of conductor 58 with ground noted above for low speed operation. The increased resistance and accompanying lower current associated with the inclusion of resistor 60 in the field winding excitation path causes the output shaft of the motor 10 to operate at a higher speed.

Although the linkage and wiper mechanism driven by the DC motor 10 are not illustrated, it is noted that they can take various conventional forms. For example, the output shaft of the motor 10 can be connected through a gear arrangement with a mechanical drive linkage to cause oscillation of rubber wiper blades to perform the wiping function. The preferred embodiment of the present invention includes an output connection with the motor shaft comprising a gear arrangement. This gear arrangement is represented symbolically in the schematic of FIG. 1 by dashed line 84 shown connected with the cam 30. It is noted that this cam can serve multiple purposes; for example, it can function in the wash mechanism of the windshield wiper system in addition to functioning in the segment wipe control arrangement.

The double crosshatched areas 86 of FIG. 2 depict the areas of windshield wiper action when the windshield wiper system is operating in the segment wipe mode. As noted above, the normal wipe areas include all of the crosshatched areas defined by both the single cross-hatching 32 and the double cross-hatching 86. The reduced wipe area of the segment wipe is wiped at a frequency greater than the normal wipe frequency.

To operate in the segment wipe mode, the movable contacts 88 and 90 of the segment wipe switch 22 are moved to engagement with the fixed contacts 92 and 94 of that switch. In this manner, the relay coil 42 is energized through a circuit traced from the positive terminal of battery 20 through conductor 40, through coil 42, through conductors 46 and 48, through contacts 88 and 92, and through ground to the negative terminal of battery 20. Thus, contact 52 is moved into engagement with contact 50 to provide excitation to both the shunt field 12 and the series field 14 through a path which includes contacts 34 and 36 if the control switch 18 is in the OFF or LOW position or resistor 60 if the control switch 18 is in the HIGH position. These two paths are identical to those recited above for low speed and high speed operation and it is noted that the speed of the motor will depend on the particular connection which is completed.

When contact 90 engages contact 94, coil 78 of relay 24 will be energized when the lobe of cam 30 causes movable contact 96 of cam actuated switch 28 to engage fixed contact 98 of that switch. The cam 30 rotates in a clockwise direction as indicated by the arrow in FIG. 1 when the windshield wipers are operated in their normal operating mode. When the windshield wipers are operated in the segment wipe mode, the cam 30 oscillates, rotating both clockwise and counterclockwise. The cam actuates both switch 26 and switch 28 whenever the windshield wipers are operating, whether the wipers are operating in the normal or the segment wipe mode.

However, the switches 26 and 28 only affect the operation of the motor 10 when the switch 22 is closed. Movable contact 96 of switch 28 is normally separated from fixed contact 98 by a spring bias arrangement whereas the contacts of switch 26 are normally biased into engagement. The cam 30 interrupts the normal configuration as the cam rotates inasmuch as the cam's lobe causes the contacts of switch 26 to separate and the contacts of switch 28 to engage as it passes the respective switches.

When the contacts of switch 28 are forced into engagement by cam 30 and coil 78 is energized, the movable contacts 66 and 68 move into engagement with the fixed contacts 74 and 76 of the double-pole, double-throw relay 24. At this time, the direction of current through armature 16 will be reversed as is seen by tracing the excitation path from the positive terminal of battery 20 through conductor 40, through contacts 50 and 52, through series field 14, through conductor 56, through contacts 68 and 76, through conductor 62, through the armature winding, through conductor 64, through conductor 80, through contacts 66 and 74, through conductor 82 to ground and through ground to the negative terminal of battery 20. The direction of this current and, accordingly, the direction of rotation of the motor 10 is the opposite of that which obtains when the relay coil 78 is deenergized and contacts 66 and 68 engage contacts 70 and 72, respectively. Thus, it should be appreciated that the direction of current flow through armature 16 depends on the state of energization of coil 78 which determines the circuit completed through the double-pole, double-throw relay 24.

Once the relay coil 78 is energized, it remains energized even though the contacts of cam actuated switch 28 separate as the cam 30 rotates in a counterclockwise direction away from the movable contact 96. The cam commences counterclockwise rotation as soon as the motor 10 reverses direction. A path from conductor 56 through the coil 78, diode 102, the closed switch 26, conductor 80, contacts 70 and 74, and conductor 82 to ground provides energization to the coil 78 when the switch 28 opens after the motor reverses direction. When the lobe on cam 30 causes switch 26 to open, the energization path for coil 78 is interrupted and movable contacts 66 and 68 again engage fixed contacts 70 and 72. At this time, the direction of current through the armature 16 is reversed and it once again follows the path associated with the normal mode of operation causing cam 30 to rotate in a clockwise direction. Cam 30 continues to rotate in this direction until contacts 96 and 98 of switch 28 are forced into engagement completing the energization path for coil 78 of relay 24. At this time, contacts 66 and 68 engage contacts 74 and 76 reversing the flow of current through armature 16. Thus, the armature 16 is alternately energized in opposing directions causing changes in the direction of its rotation. Each of these motor reversals is accompanied by a reversal in the direction of travel of the windshield wipers 11, thus providing the segment wipe mode of operation. Inasmuch as the motor reversals are caused when cam 30 actuates the two switches 26 and 28, it is noted that the area and the position of the segment wipe can be adjusted by altering the positions at which the cam 30 actuates these two switches 26 and 28.

From the foregoing, it should be understood that the present invention affords both full area wipe and segment wipe modes of operation. In the segment wipe mode, the wipe area is substantially less than the normal area; but, the wipe frequency is substantially greater in the segment wipe mode than in the normal mode. This frequency increase is apparent inasmuch as the motor drives the wipers at the same surface speed in both modes, but the distance covered is reduced in the segment wipe mode.

Although this description has proceeded in terms of a particular embodiment considered the preferred form of this invention, it should be appreciated that various changes and modifications could be engrafted on the example which are within the contemplation of the invention.

I claim:

1. A segment wipe control for an automobile windshield wiper system, comprising: a source of direct voltage, a windshield wiper mechanism, a DC motor having an output shaft coupled to drive said windshield wiper mechanism whenever said shaft rotates, a switch coupled to said motor and to said source of direct voltage for energizing said motor for continuous rotation in a single direction to cause said wiper mechanism to oscillate and the wiper to traverse a normal wiping area, a segment wipe selector switch interconnecting said source of direct voltage and said DC motor whereby a segment wipe mode of windshield wiper operation can be selected, and motor reversing means coupled to said segment wipe selector switch and responsive to predetermined angular rotation of said output shaft to periodically reverse the direction of current supplied said DC motor to periodically reverse the direction of rotation of said output shaft and said wiper mechanism when said segment wipe switch is shifted to a predetermined position, said motor reversals occurring at less than the normal full travel of said wiper mechanism to cause said wiper mechanism to traverse an area substantially less than the area of the normal wipe to effect a segment wipe when said segment wipe switch is shifted to a predetermined position.

2. A segment wipe control for an automobile windshield wiper system, comprising: a source of direct voltage, a DC motor having an output shaft coupled to drive a wiper mechaniam whenever said shaft rotates, a switch coupled to said motor and to said source of direct voltage for energizing said motor for continuous operation in a single direction to cause said wiper mechanism to oscillate and the wiper to traverse a normal wiping area, a segment wipe selector switch, a double-pole, double-throw relay having a relay coil, means interconnecting said segment wipe selector switch, said relay, said source of direct voltage and said DC motor to permit selection of a segment wipe mode of windshield wiper operation, the contacts of said relay being connected between said source of direct voltage and said DC motor to control the direction of current supplied said DC motor and the direction of rotation of said DC motor according to the state of energization of said relay coil, first and second cam actuated switches, a cam connected with the output shaft of said DC motor operative to actuate said cam actuated switches, and means connecting said relay coil for energization from said source of direct voltage through said cam actuated switches, said cam actuated switches being alternately actuated by said cam to cause reversal of said DC motor and said wiper mechanism when said segment wipe switch is closed to provide a segment wipe by said windshield wiper system having an area substantially less than the area of the normal wipe and a wipe frequency substantially greater than the wipe frequency of the normal wipe.

3. A two-speed segment wipe control for an automobile windshield wiper system, comprising: a source of direct voltage, a wiper mechanism, a DC motor having an output shaft coupled to drive said wiper mechanism whenever said shaft rotates, a control switch having OFF, LOW, and HIGH positions, means connecting said control switch, said source of direct voltage and said DC motor to permit energization of said DC motor for continuous rotation in a single direction to provide normal operation of said windshield wiper system in which said control switch provides control of said DC motor and said wiper mechanism including the selection of low speed and high speed operation, a segment wipe selector switch, a double-pole, double-throw relay having a relay coil, means interconnecting said segment wipe selector switch, said relay, said source of direct voltage and said DC motor whereby a segment wipe mode of windshield wiper operation can be selected, the contacts of said relay being connected between said source of direct voltage and said DC motor to control the direction of current supplied said DC motor and the direction of rotation of said DC motor according to the state of energization of said relay coil, first and second cam actuated switches, a cam connected with the output shaft of said DC motor operative to actuate said cam actuated switches, and means connecting said relay coil for energization from said source of direct voltage through said cam actuated switches when said segment wipe switch is closed, said cam actuated switched being alternately actuated by said cam to cause reversals of said DC motor and said wiper mechanism when said segment wipe switch is closed to provide a segment wipe by said windshield wiper system having an area substantially less than the area of the normal wipe, said control switch being connected with said segment wipe switch and affecting the segment wipe mode of operation of said windshield wiper system by providing low speed and high speed DC motor operation according to the position of the control switch, said DC motor operating at low speed in the segment wipe mode if said control switch is in the OFF or LOW positions and operating at high speed in the segment wipe mode if said control switch is in the HIGH position.

* * * * *